(12) United States Patent
Kawamura et al.

(10) Patent No.: US 7,357,153 B2
(45) Date of Patent: Apr. 15, 2008

(54) PRESSURE-REDUCING VALVE FOR HIGH-PRESSURE GAS CYLINDERS

(75) Inventors: Nobuyuki Kawamura, Tokyo (JP); Yoshio Nuiya, Saitama (JP)

(73) Assignees: Hamai Industries Limited, Tokyo (JP); Honda Motor Co., Ltd., Saitama (JP)

( * ) Notice: Subject to any disclaimer, the term of this patent is extended or adjusted under 35 U.S.C. 154(b) by 157 days.

(21) Appl. No.: 10/997,793

(22) Filed: Nov. 24, 2004
(Under 37 CFR 1.47)

(65) Prior Publication Data
US 2006/0157122 A1    Jul. 20, 2006

(30) Foreign Application Priority Data
Nov. 25, 2003    (JP)    ............................. 2003-393360

(51) Int. Cl.
*G05D 16/06*    (2006.01)
(52) U.S. Cl. .................................. 137/613; 137/505.25
(58) Field of Classification Search ................ 137/613, 137/505.25
See application file for complete search history.

(56) References Cited

U.S. PATENT DOCUMENTS 5,741,049 A * 4/1998 Sorensen .................. 303/9.75
7,080,655 B2 * 7/2006 Jacksier et al. ............. 137/613
7,159,611 B2 * 1/2007 Larsen .................. 137/505.25

FOREIGN PATENT DOCUMENTS

JP    2000-257797    9/2000

* cited by examiner

*Primary Examiner*—Kevin Lee
(74) *Attorney, Agent, or Firm*—Townsend and Townsend and Crew

(57) ABSTRACT

A first valve chest 241 formed integrally with a lid 2 of a high-pressure gas cylinder, a first valve element 5, a spring 6, a second valve chest 32, a second valve element 7, a spring 8 and a main body 8 are all formed in a rotor-shape, and in addition to arranging their axis lines on the same axis lime, flow channels 56, 35 and 76 are arranged on said axis line. By forming each part in a rotor-shape and adjusting the vibration directions of the valve elements 5 and 7 to the same direction, miniaturization is contemplated while suppressing loads generated by vibration. This invention is to provide a compact two-step pressure-reducing valve usable for a long term.

11 Claims, 1 Drawing Sheet

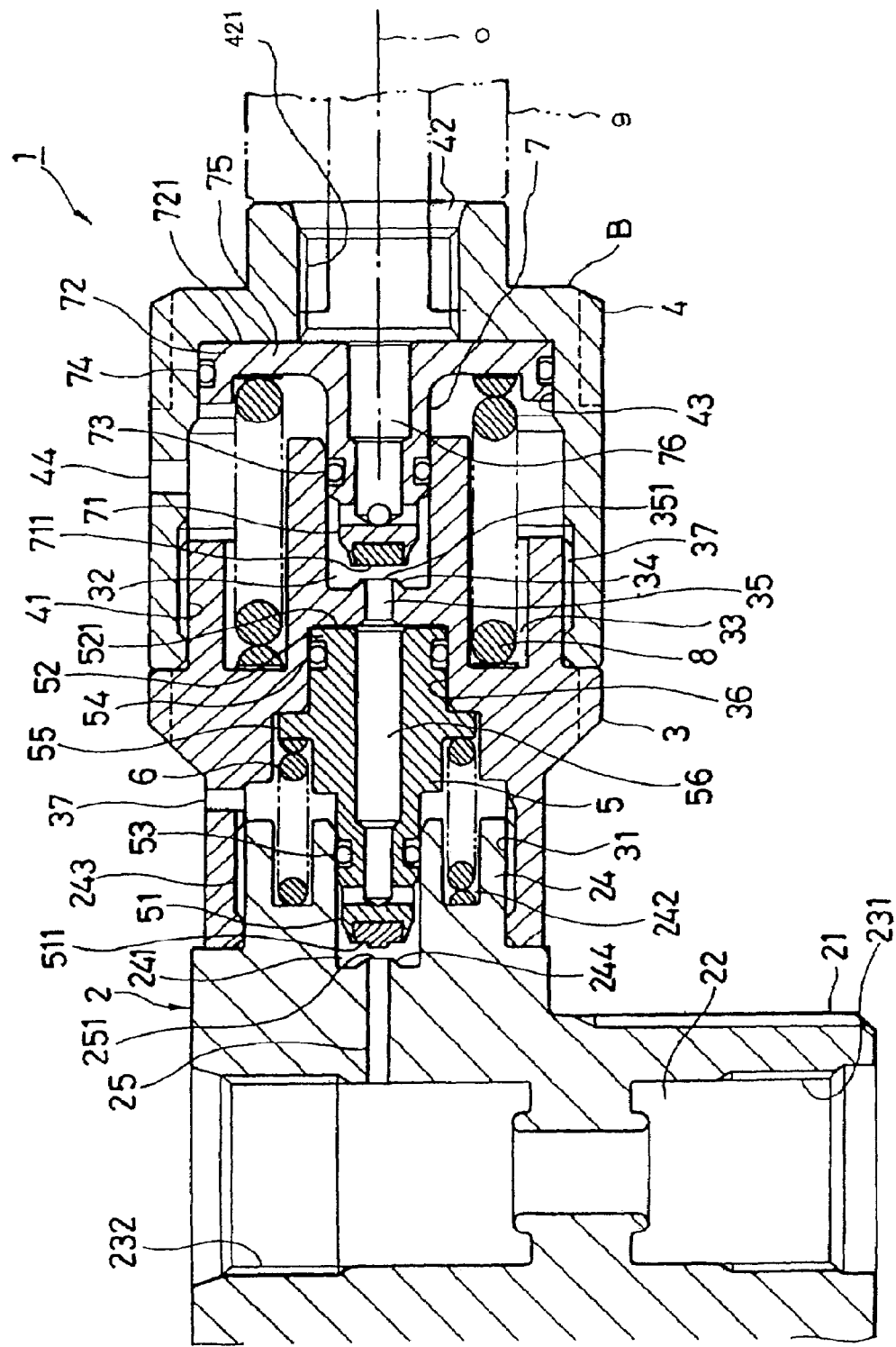

PRESSURE-REDUCING VALVE FOR HIGH-PRESSURE GAS CYLINDERS

CROSS-REFERENCES TO RELATED APPLICATIONS

This patent application claims priority from Japanese Application No. 2003-393360, filed Nov. 25, 2003, the full disclosure of which is incorporated herein by reference.

BACKGROUND OF THE INVENTION

This invention relates to a pressure-reducing valve for high-pressure gas cylinders employed when taking out a high-pressure gas contained in a high-pressure gas cylinder.

When storing a gas such as hydrogen gas for fuel cell systems, a high-pressure gas cylinder containing highly compressed gas is ordinarily used. When taking out the gas from the high-pressure gas cylinder, the gas pressure is reduced down to the intended pressure through a pressure-reducing valve and the gas filled in the cylinder is taken out.

Hereupon, the gas contained in the cylinder is filled in at an extremely high pressure (e.g., approximately 70 MPa) in order to increase a gas loadage, and consequently it is impossible to reduce the pressure with high accuracy to the intended secondary pressure by just one pressure reducing operation. However, by employing a two-step pressure reducing method, the second pressure reducing mechanism can set the gas pressure up as the intended secondary pressure with high accuracy.

Such a two-step pressure reducing mechanism is already known in, for example, Unexamined Japanese Patent Publication No. 2000-257797.

However, the above-mentioned pressure reducing mechanism ordinary used requires a supply channel to supply a gas from a high-pressure gas cylinder to the pressure reducing mechanism. In case that the gas is a fuel gas, the shorter such a supply channel for a high-pressure gas is, the higher safety it has, assuming the case of breakage by an external impact such as an accident. The patent literature 1 describes a mechanism that two pressure-reducing valves are integrated in a cylinder valve. When employing such an integration of a two-step pressure reducing mechanism for a pressure reduction of a high-pressure gas, there exist the following problems.

A frequency of vibration of a valve element is increased when reducing a pressure of a high-pressure gas, and therefore loads applied to each part are increased due to the vibration. Further, a two-step pressure reducing mechanism requires two valve elements, and therefore loads applied to the entire pressure reducing mechanism is further increased by vibrations generated by these two vibratory sources. For this reason, constituent parts have become easily broken and a failure frequency has been increased.

The object of the invention is to provide a pressure-reducing valve for a high-pressure gas and particularly to provide a two-step pressure-reducing valve usable for a long term.

BRIEF SUMMARY OF THE INVENTION

The above-mentioned object can be accomplished by the following present invention.

A pressure-reducing valve to be mounted on a lid of a high-pressure gas cylinder has a first valve chest formed in the lid, a first valve seat formed in the first valve chest, a first flow channel communicating between an opening part of the first valve seat and the inside of the cylinder, a first valve element capable of reciprocating between a closing position sealing the first valve seat and an opening position apart from the first valve seat while retaining an air-tightness in the first valve chest, a first energizing member for energizing the first valve element in the direction of the opening position, a first pressure-reducing chamber communicating with the first valve chest and located at the downstream side of the first valve chest, a second flow channel communicating with a second valve chest in the first pressure-reducing chamber, a second valve seat formed in the second valve chest and having an opening part of the second flow channel, a second valve element capable of reciprocating between a closing position sealing the second valve seat and an opening position apart from the second valve seat while retaining an air-tightness in the second valve chest, a second energizing member for energizing the second valve element in the direction of the opening position, a second pressure-reducing chamber communicating with the second valve chest and located at the downstream side of the second valve chest, and a main body containing the first valve element, the first energizing member, the second valve element and the second energizing member, wherein the first valve element and the second valve element are reciprocated on the same axis line.

According to this invention, since two valve elements vibrate on the same axis line, an increase in load applied to the entire mechanism due to two vibratory sources can be suppressed. In particular, although an impact due to a vibration generated becomes too large when reducing a pressure of a high-pressure gas, an increase in load applied to the entire mechanism can be fully suppressed for such vibrations of valve elements. In addition, since a lid of a high-pressure gas cylinder is one of constituent elements, an installation space can be further reduced.

The pressure-reducing valve for a high-pressure gas cylinder according to the above invention, wherein the first valve element, the second valve element and the main body are formed in a rotor-shape and a center axis of each is located on the same axis line.

According to this invention, since each member is formed in a rotor-shape and a direction of vibration is in an axial direction of the rotor, the vibration uniformly propagates outwards from the center of the rotor and therefore a stress concentration partially arose can be reduced.

The pressure-reducing valve for a high-pressure gas cylinder according to the above inventions, wherein the first valve element has a communication channel communicating between the first valve chest and the first pressure-reducing chamber and the second valve element has a communication channel communicating between the second valve chest and the second pressure-reducing chamber, respectively.

According to this invention, since a communication channel is set up inside a valve element, miniaturization of a pressure-reducing valve can be contemplated.

The pressure-reducing valve for a high-pressure gas cylinder according to any one of the above inventions, characteristic frequencies of the lid, the first valve element, the second valve element and the main body are different from one to another.

According to this invention, since a characteristic frequency of each member is different from one to another, a resonance can be suppressed and therefore breakage of each member due to the resonance can be prevented.

The pressure-reducing valve for a high-pressure gas cylinder according to any one of the above inventions, wherein it has an exhaust port communicating with the second pressure-reducing chamber, the exhaust port is placed on the axis line on which the first valve element and the second valve element are arranged and an axis line of a pipe connected to the exhaust port is in parallel with the axis line.

According to the present invention, since an exhaust port is placed on an axis line of both a first valve element and a second valve element and an axis line of a pipe connected to the exhaust port corresponds to the axis line of both a first valve element and a second valve element, a direction of vibration propagating to the pipe becomes in the axial direction and therefore bending of the pipe generated by the vibration can be suppressed.

BRIEF DESCRIPTION OF THE DRAWINGS

The FIGURE is a cross-sectional side view of the pressure-reducing valve of the present invention.

DETAILED DESCRIPTION OF THE INVENTION

A preferred embodiment of the pressure-reducing valve according to the present invention will be described below in detail with reference to the accompanying drawing. The FIGURE is a cross-sectional side view of the pressure-reducing valve of the present invention. A pressure-reducing valve 1 is mounted in a high-pressure gas cylinder and is equipped with a lid 2 of the high-pressure gas cylinder, a main body B, a first valve element 5 contained in the main body B, a spring 6, a second valve element 7 and a spring 8. The lid 2 has a screw part 21 on its lateral surface to screw to the high-pressure gas cylinder and has an exhaust channel 22 opening to the inside of the high-pressure gas cylinder at one end and also opening to the outside of the high-pressure gas cylinder at the other end. At the both end opening parts of the exhaust channel 22, a female screw part 231 for connecting an in-tank apparatus or something and a female screw part 232 for screwing a shutoff valve into are formed.

A connection part 24 connecting the main body B of the pressure-reducing valve is projected on the side surface of the lid 2 and a male screw part 243 for connecting the main body B is formed on the peripheral surface of the lid. A first valve chest 241 is formed at the center of the connection part 24 and a spring container 242 for containing a spring is formed concentrically with the first valve chest 241 around the first valve chest 241. A first valve seat 244 is formed at the bottom of the first valve chest 241 and an opening part 251 at which one end of a first flow channel 25 is opened is formed at the center of the first valve seat 244. The other end of the first flow channel 25 is opened into the exhaust channel 22 and a high-pressure gas (a primary pressure gas) in the high-pressure gas cylinder is adapted to flow into the first valve chest 241 through the first flow channel 25.

The main body B is connected to the lid 2 and is equipped with a first member 3 containing the first valve element 5 and a second member 4 containing the second valve element 7. The first member 3 is formed in a cylindrical shape that is a rotor-shape and a female screw part 31 is formed on the inner peripheral surface of the front end of the first member 3. At the center of the rear end of the first member 3, a second valve chest 32 is formed and a spring container 33 for containing a spring is formed concentrically with the second valve chest 32 around the second valve chest 32. On the outer peripheral surface of the rear end part of the first member 3, a male screw part 37 for screwing the second member 4 is formed.

A second valve seat 34 is formed at the bottom of the second valve chest 32 and an opening part 351 is formed at the center of the second valve seat 34. On the other side of the second valve chest 32, a valve element container 36 for containing the rear end part of the first valve element 5 is formed and a second flow channel 35 is formed between the valve element container 36 and the second valve chest 32. An opening at the second valve chest 32 side of the second flow channel 35 is the opening part 351.

In an internal space formed by both the connection part 24 and the first member 3, the first valve element 5 and the first spring 6, which is a first energizing member, are contained. The first valve element 5 is formed in a rotor-shape, of which a front end 51 is inserted into the first valve chest 241 and a rear end 52 is contained in the valve element container 36. An O-ring 53 is inserted between the inner wall of the first valve chest 241 and the outer peripheral surface of the first valve element 5 and therefore the first valve element 5 is adapted to be capable of reciprocating in an axial direction while retaining an air-tightness of the first valve chest 241. A first pressure-reducing chamber is comprised of a rear end surface 521 of the first valve element 5 and the valve element container 36. In addition, an O-ring 54 is inserted between the inner wall of the valve element container 36 and the outer peripheral surface of the first valve element 5 and therefore the first valve element 5 is adapted to be capable of reciprocating in an axial direction while retaining an air-tightness of the first pressure-reducing chamber. On the outer peripheral surface of the first valve element 5 a flange 55 is formed and a compressed spring 6 is inserted between the flange 55 and the spring container 242.

The first valve element 5 is adapted to be capable of reciprocating between a closing position at which a gas leakage is stopped because of a front end surface 511 contacted by pressure of the first valve seat 244 and an opening position at which the front end surface 511 is apart from the first valve seat 244. The spring 6 energizes the first valve element toward the opening position. Since the movement of the first valve element 5 varies a volume of a space containing the spring 6, a vent 37 is formed on the side surface of the first member 3 to maintain a pressure of the space so that the movement of the first valve element 5 is not interrupted.

At the center of the first valve element 5 a communication channel 56 is formed along an axis line O, of which the front end opens onto the side surface of the front end 51 and the rear end opens onto the center of the rear end surface 521. The first valve chest 241 is communicated with the first pressure-reducing chamber through the communication channel 56.

The second member 4 is formed in a cylindrical shape that is a rotor-shape shape and a female screw part 41 is formed on the inner peripheral surface of the front end of the second member 4. At the center of the rear end of the second member 4, an exhaust port 42 is formed, in which a valve element container 43 is formed. On the inner peripheral surface of the exhaust port 42 a female screw part 421 is formed and an axis line of the female screw part 421 is identical with the axis line O in common with the first valve element 5 and the second valve element 7. By employing such a configuration, an axis line of a pipe 9 screwed in the female screw part 421 becomes identical with the axis line O in common with the first valve element 5 and the second valve element 7. For this reason, vibrations generated by movements of the first valve element 5 and the second valve element 7 becomes vibrations reciprocating in an axial direction of the pipe. When applying vibrations to a pipe in perpendicular direction to its axis line, the generation of bending becomes significant due to the vibrations and leads to loosing and separation of connection parts. However, vibrations in an axial direction can suppress such disadvantageous occurrences.

In an internal space formed by both the first member 3 and the second member 4, the second valve element 7 and the second spring 8, which is a second energizing member, are contained. The second valve element 7 is formed in a rotor-shape, of which a front end 71 is inserted into the second valve chest 32 and a rear end 72 is contained in the valve element container 43. An O-ring 73 is inserted between the inner wall of the second valve chest 32 and the outer peripheral surface of the second valve element 7 and therefore the second valve element 7 is adapted to be capable of reciprocating in an axial direction while retaining an air-tightness of the second valve chest 32. A second pressure-reducing chamber is comprised of a rear end surface 721 of the second valve element 7 and the valve element container 43. On the outer peripheral surface of the rear end of the second valve element 7 a flange 75 is formed and a compressed spring 8 is inserted between the flange 75 and a spring container 33. In addition, an O-ring 74 is inserted between the inner wall of the valve element container 33 and the peripheral end surface of the flange 75 and therefore the second valve element 7 is adapted to be capable of reciprocating in an axial direction while retaining an air-tightness of the second pressure-reducing chamber.

The second valve element 7 is adapted to be capable of reciprocating between a closing position at which a gas leakage is stopped because of a front end surface 711 contacted by pressure of the second valve seat 34 and an opening position at which the front end surface 711 is apart from the second valve seat 34. The spring 8 energizes the second valve element 7 toward the opening position. Since the movement of the second valve element 7 varies a volume of a space containing the spring 6, a vent 44 is formed on the side surface of the second member 4 to maintain a pressure of the space so that the movement of the second valve element 7 is not interrupted.

At the center of the second valve element 7 a communication channel 76 is formed along the axis line O, of which the front end opens onto the side surface of the front end 71 and the rear end opens onto the center of the rear end surface 721. The second valve chest 32 is communicated with the second pressure-reducing chamber through the communication channel 76.

The pressure-reducing valve 1 of the present invention configured as above reciprocates (vibrates) a valve element at a high speed between a closing position and an opening position by a balance between an energizing force of a spring and a force applied to the valve element by a gas pressure in a pressure-reducing chamber, reduces a pressure (a primary pressure) of a high-pressure gas cylinder down to a secondary pressure in the first pressure-reducing chamber by the movement of the first valve element 5, and reduces the secondary pressure further down to a tertiary pressure in the second pressure-reducing chamber by a similar movement of the second valve element 7 to the first valve element. This kind of pressure-reducing valve for a high-pressure gas cylinder of the present invention can, for example, set up a tertiary pressure value (a pressure value when a gas is finally used) with high accuracy even when a gas pressure of a high-pressure gas cylinder is under considerably high pressure as in the range of 30 to 80 MPa.

In addition, since the communication channel 56 communicating between the first valve chest 241 and the first pressure-reducing chamber is formed inside of the first valve element 5 and also the communication channel 76 is formed inside of the second valve element 7, the entire size of the pressure-reducing valve 1 can be adapted to be miniaturized.

Hereupon, since the first valve element 5 and the second valve element 7 are arranged on the same axis line O, vibration directions of them become the same direction. Also, each member is in a rotor-shape and these are adapted to be serially combined in the axial direction. In addition, since the vibration direction is along the axial direction, stress applied to each member due to the vibration becomes easy to be uniformly dispersed and therefore partial stress concentration is adapted to be relaxed. In other words, since the valve elements 5, 7 and the main body B are in a rotor-shape and vibration loads are applied in the axial direction of which strength for loads is highest, durability for vibration loads is improved in comparison with the case that loads are applied from a lateral direction of them. Although the number of vibration sources (valve elements) become two, their vibration directions correspond to each other and therefore sufficient durability for loads can be obtained in comparison with the case that two different vibrations are simultaneously applied from different directions.

Further, the first flow channel 25, the first valve chest 241, the communication channel 56 of the first valve element 5, the communication channel 76 of the second valve element 7 and the exhaust port 42 are all placed on the identical axis line to those of the first valve element 5 and the second valve element 7, and each part is in a rotor-shape, of which an axis line is located on the same axis line O. Thus, by arranging each constituent part on the same axis line O and also adjusting the gas communication channels to the axis line O, miniaturization is realized while improving the durability for vibrations.

In particular, since an appearance of the main body B formed in a compact size is rotor-shaped and the first flow channel 25 and the exhaust port 42 are provided at the both end parts placed on the axis line O of the main body, the main body can be set up integrally with piping as a part of a piping path and therefore has the advantage that there is no need to take an arrangement space.

Further, the first and second members 3, 4 and the lid 2 composing two valve elements and the main body B have different characteristic frequencies, and therefore breakage of members due to resonance can be suppressed.

What is claimed is:
1. A pressure-reducing valve mounted on a lid of a high-pressure gas cylinder, comprising:
  a first valve chest formed in said lid;
  a first valve seat formed in said first valve chest;
  a first flow channel communicating between an opening part of the first valve seat and an inside of the high pressure gas cylinder;
  a first valve element capable of reciprocating between a closing position sealing the first valve seat and an opening position apart from the first valve seat while retaining an air-tightness in the first valve chest;
  a first energizing member for energizing the first valve element in a direction of the opening position;
  a first pressure-reducing chamber communicating with the first valve chest and located at a downstream side of the first valve chest;
  a second flow channel communicating with a second valve chest in the first pressure-reducing chamber;
  a second valve seat formed in the second valve chest and having an opening part of the second flow channel;

a second valve element capable of reciprocating between a closing position sealing the second valve seat and an opening position apart from the second valve seat while retaining an air-tightness in the second valve chest;

a second energizing member for energizing the second valve element in a direction of the opening position;

a second pressure-reducing chamber communicating with the second valve chest and located at a downstream side of the second valve chest; and a main body containing the first valve element, the first energizing member, the second valve element and the second energizing member, wherein the first valve element and the second valve element are reciprocated on a same axis line.

2. The pressure-reducing valve for the high-pressure gas cylinder according to claim 1, wherein the first valve element, the second valve element and the main body are formed in a rotor-shape and a center axis of each is located on the same axis line.

3. The pressure-reducing valve for the high-pressure gas cylinder according to claim 1, wherein the first valve element has a communication channel communicating between the first valve chest and the first pressure-reducing chamber and the second valve element has a communication channel communicating between the second valve chest and the second pressure-reducing chamber, respectively.

4. The pressure-reducing valve for the high-pressure gas cylinder according to claim 2, wherein the first valve element has a communication channel communicating between the first valve chest and the first pressure-reducing chamber and the second valve element has a communication channel communicating between the second valve chest and the second pressure-reducing chamber, respectively.

5. The pressure-reducing valve for high-pressure gas cylinder according to claim 1, wherein characteristic frequencies of the lid, the first valve element, the second valve element and the main body are different from one to another.

6. The pressure-reducing valve for the high-pressure gas cylinder according to claims 2, wherein characteristic frequencies of the lid, the first valve element, the second valve element and the main body are different from one to another.

7. The pressure-reducing valve for the high-pressure gas cylinder according to claim 3, wherein characteristic frequencies of the lid, the first valve element, the second valve element and the main body are different from one to another.

8. The pressure-reducing valve for high-pressure gas cylinder according to claim 1, further comprising an exhaust port communicating with said second pressure-reducing chamber, the exhaust port is placed on the axis line on which the first valve element and the second valve element are arranged and an axis line of a pipe connected to the exhaust port is in parallel with said axis line.

9. The pressure-reducing valve for high-pressure gas cylinder according to claim 2, further comprising an exhaust port communicating with said second pressure-reducing chamber, the exhaust port is placed on the axis line on which the first valve element and the second valve element are arranged and an axis line of a pipe connected to the exhaust port is in parallel with said axis line.

10. The pressure-reducing valve for high-pressure gas cylinder according to claim 3, further comprising an exhaust port communicating with said second pressure-reducing chamber, the exhaust port is placed on the axis line on which the first valve element and the second valve element are arranged and an axis line of a pipe connected to the exhaust port is in parallel with said axis line.

11. The pressure-reducing valve for high-pressure gas cylinder according to claim 4, further comprising an exhaust port communicating with said second pressure-reducing chamber, the exhaust port is placed on the axis line on which the first valve element and the second valve element are arranged and an axis line of a pipe connected to the exhaust port is in parallel with said axis line.

* * * * *